United States Patent Office 2,863,701
Patented Dec. 9, 1958

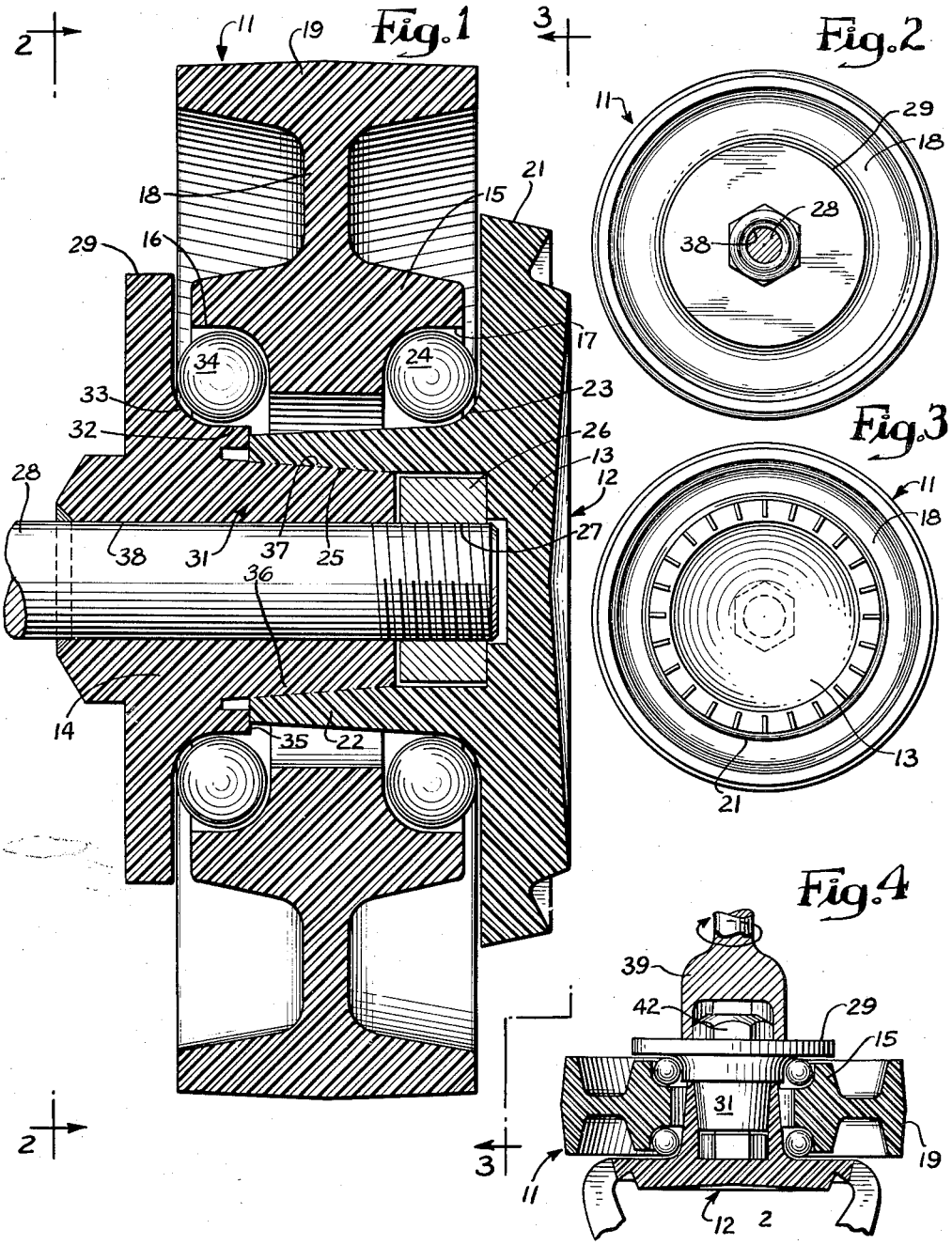

2,863,701

WHEEL ASSEMBLY

Charles E. Jones, Chicago, and William G. Crowle, Berwyn, Ill., assignors to Manning Manufacturing Corporation, Chicago, Ill., a corporation of Illinois Application May 11, 1956, Serial No. 584,341

2 Claims. (Cl. 301—5.7)

The invention relates to improvements in the construction of wheel assemblies and is more particularly concerned with the novel construction, assembly and mounting of an anti-friction wheel of the type used on roller skates.

Heretofore roller skate wheels have been made of metal or wood and in either instance their mounting involved the use of two pairs of anti-friction bearing raceways and their attendant washers mounted on a hub secured to an axle shaft by means of a nut threaded thereon. When metal wheels are used they are fabricated from several stampings joined into a unitary assemblage by costly machine operations.

The present invention contemplates the avoidance of the costly machine operations required to produce and assemble prior known types of wheel assemblies and in this respect the wheel and its mounting parts are fabricated by molding. Nylon-plastic has been found to be the most suitable because of its toughness and resistance to wear, although it should be understood that other moldable material may be used. However, nylon-plastic has the attribute of being rendered tacky or fusible in the presence of sufficient heat and this characteristic is put to a useful purpose in the method of assembly hereinafter described. Specifically, this characteristic is utilized to create a permanent bond between two of the parts of the assembly after the parts are in their assembled relationship.

It is therefore an object of the invention to provide a novelly constructed wheel assembly.

Another object is to provide a novelly constructed inner raceway or hub for a wheel mounting.

Another object is to provide a novel two piece inner raceway from fusible material that will readily bond, one piece to the other, upon application of friction generated heat.

Another object is to provide a new hub structure for an anti-friction wheel assembly with novel means for securing said assembly on an axle.

Another object of the invention is to provide a wheel assembly of the character described which is not expensive or difficult to manufacture and assemble, is very durable in its construction, and is extremely efficient in its use.

With the foregoing and such other objects in view, which will appear as the description proceeds, the invention consists of certain novel features of construction, arrangement and combination of parts hereinafter fully decribed, illustrated in the accompanying drawings, and particularly pointed out in the appended claims, it being understood that various changes in form, proportion, size and minor details of the structure may be made without departing from the spirit of the invention.

Referring to the drawings in which the same characters of reference are employed to identify corresponding parts:

Fig. 1 is a diametrical sectional view of a wheel and its mounting, embodying the features of the invention.

Fig. 2 is a sectional view of the assembly taken on line 2—2 of Fig. 1.

Fig. 3 is an outside elevational view of the assembly taken on line 3—3 of Fig. 1.

Fig. 4 is a fragmentary central sectional view of the wheel showing a hub portion in elevation and illustrating a method employed to bond the hub parts together.

The assembly illustrated in the accompanying drawings includes a wheel portion 11 and a hub assembly generally indicated at 12. The hub portion consists of two separate parts 13 and 14 which are bonded or otherwise securely joined together during assembly into a single piece. The specific preferred method used to accomplish this is explained in detail hereinafter and it is sufficient to note at this time that the parts 11, 13 and 14 are preferably molded from a tough wear-resistant material such as nylon-plastic or its equivalent.

The wheel portion 11 includes a tubular center boss 15 having ball bearing raceways 16 and 17 formed on its inside bore, one adjacent each end thereof. Extending outwardly from the boss 15 and integral therewith, is a web 18 that merges into a rim or tire 19, the outside surface of which constitutes the rolling surface of the wheel portion 11.

The hub portion part 13 includes a circular flange or end wall 21 having projecting from one of its faces, a cylindrical body 22. The body 22 is integral with the flange 21 and the meeting of the outside surface of said body with the related face of the flange is suitably curved to define an inner anti-friction bearing raceway 23 to coact with the outer raceway 17 for confining the anti-friction elements 24 in the customary manner to present an anti-friction mounting between the wheel portion 11 and the hub part 13. The interior surface 25 of the cylindrical body 22 is tapered slightly so as to provide a slightly reduced circumference at its inner extremity for a purpose to be explained presently. The extreme end of the interior of the body portion 22 is suitably formed to receive snugly therein, a hexagonal nut 26 or other non-circular member, having an axially tapped hole 27 therein to receive the threaded end of a shaft or axle 28 upon which the assembly is mounted.

The assembly is completed upon the association of the hub part 14 with the hub part 13 in a manner now to be described. As shown, the hub part 14 includes a circular flange 29 and a cylindrical body 31 including a large diameter portion 32 that merges with the flange to provide a curved annular raceway 33 which coacts with the raceway 16 to contain anti-friction bearings 34. The large diameter portion 32 terminates in a circumferential shoulder 35 having, extending outwardly therefrom, a smaller diameter portion 36 of the cylindrical body 31. This portion 36 has its outside circumferential face 37 tapered towards its free end and it is of such diameter as to have a snug fit into the body portion 22 of the companion hub portion 13. An axial bore 38 in the cylindrical body 31 permits extension of the shaft or axle 28 to the nut 26.

In order to prevent inadvertent separation of the hub portions 13—14 when the wheel assembly is removed from the axle, or otherwise, the two portions 13 and 14 are securely bonded or welded together after assembly. This may be accomplished by applying aqueous phenol to the matching surfaces 25 and 37. Another and perhaps a more practical way to accomplish this bonding is to mount the assembly in a jig including means (Fig. 4) to hold one of the parts, such as part 13, against rotation and to engage the other part, such as part 14, in a tool 39 capable of being rotated at a sufficiently high rate of speed so as to raise the temperature of the frictionally sliding surfaces 25 and 37 to a degree that will cause a slight softening of the plastic in the immediate region of said surfaces. When rotation is stopped, the temperature recedes and the two parts are permanently bonded or fused together.

Engagement of the hub portion 14 by a tool 39 may be made less difficult by providing an axial hexagonal protuberance 42 on the outwardly disposed face of the flange 29. This protuberance also serves as engageable means for rotating the assembled hub portion while threading the nut 26 therein onto the axle 28.

Although an exemplary embodiment of the invention has been shown and described, it should be understood that the invention is capable of being embodied in a wide variety of modified structures and that it is not desired to limit the invention to the disclosure but to embrace such variations as will fall within the scope of the appended claims.

We claim:

1. A wheel assembly comprising a wheel including a rim and an axial boss having an axial opening therethrough, outer bearing raceways in said boss at each end of said axial opening, a hub part including a cylindrical body closed at one end and telescoped into one end of said axial opening, an external annular flange on the closed end of said cylindrical body, said flange overlying the axial boss, an inner bearing raceway at the juncture of the body with the flange to coact with one of the outer raceways to retain anti-friction elements in place, a second hub part including a cylindrical body open at both ends telescoped into the other end of the axial opening, said second cylindrical body having an outside cylindrical surface corresponding substantially to the inside cylindrical surface of the first cylindrical body so as to be received snugly therein, the complemental faces of the interfitting parts being tapered, an external annular flange on the outermost end of said second hub part overlying the axial boss, an inner bearing raceway on the second hub part complemental to the other outer raceway to retain antifriction elements in place, said hub parts being rotatable relative to the wheel as a single unit, and means in said joined hub parts for securing the assembly on an axle.

2. A wheel assembly comprising a wheel including a rim and an axial boss having an axial opening therethrough, outer bearing raceways in said boss at each end of said axial opening, a hub part including a cylindrical body closed at one end and telescoped into one end of said axial opening, an external annular flange on the closed end of said cylindrical body, said flange overlying the axial boss, an inner bearing raceway at the juncture of the body with the flange to coact with one of the outer raceways to retain anti-friction elements in place, a second hub part including a cylindrical body open at both ends telescoped into the other end of the axial opening, said second cylindrical body having an outside cylindrical surface corresponding substantially to the inside cylindrical surface of the first cylindrical body so as to be received snugly therein, the complemental faces of the interfitted parts being tapered, an external annular flange on the outermost end of said second hub part overlying the axial boss, an inner bearing raceway on the second hub part complemental to the other outer raceway to retain anti-friction elements in place, said hub parts being rotatable relative to the wheel as a single unit, means in said joined hub parts for securing the assembly on the axle, and manually engageable means on said second hub part to facilitate securement of said hub on said axle.

References Cited in the file of this patent

UNITED STATES PATENTS

| | | |
|---|---|---|
| 1,448,152 | Ricke | Mar. 13, 1923 |
| 2,300,444 | Ware | Nov. 3, 1942 |
| 2,580,489 | Wagner | Jan. 1, 1952 |
| 2,634,168 | Maxam | Apr. 7, 1953 |
| 2,646,378 | Morin | July 21, 1953 |
| 2,669,485 | Newman et al. | Feb. 16, 1954 |
| 2,749,264 | Emrick | June 5, 1956 |